Feb. 28, 1950 E. P. KINNE 2,498,959
COUPLER
Filed Feb. 3, 1947 5 Sheets-Sheet 1

INVENTOR
EDMUND P. KINNE
BY
ATTORNEY

Feb. 28, 1950 E. P. KINNE 2,498,959
COUPLER
Filed Feb. 3, 1947 5 Sheets-Sheet 2

INVENTOR
EDMUND P. KINNE
BY
ATTORNEY

INVENTOR
EDMUND P. KINNE
ATTORNEY

Feb. 28, 1950 E. P. KINNE 2,498,959
COUPLER
Filed Feb. 3, 1947 5 Sheets-Sheet 4

INVENTOR
EDMUND P. KINNE
BY
ATTORNEY

Feb. 28, 1950     E. P. KINNE     2,498,959
COUPLER Filed Feb. 3, 1947     5 Sheets-Sheet 5

INVENTOR
EDMUND P. KINNE
BY

ATTORNEY

Patented Feb. 28, 1950

2,498,959

UNITED STATES PATENT OFFICE 2,498,959

COUPLER

Edmund P. Kinne, Alliance, Ohio, assignor to American Steel Foundries, Chicago, Ill., a corporation of New Jersey Application February 3, 1947, Serial No. 726,172

32 Claims. (Cl. 213—148)

My invention relates to car couplers and more particularly to improvements in automatic couplers of the A. A. R. Standard types having rotary lock operating mechanisms.

My present application is an improvement on the lock-to-the-lock mechanism shown in my co-pending application Serial No. 637,524, filed in the United States Patent Office on December 28, 1945.

The present A. A. R. Standard couplers of the type described are provided with an anticreep device maintained in locked position by gravity alone. The anticreep is not a positive lock and is subject to external forces such as may cause it to disengage from the engaging means on the coupler, thus permitting the coupler to unlock. This usually occurs when the present day freight cars are operated under high speeds, the unlocking of the coupler causing train parting resulting in damage and delays.

An object of my invention is to provide positive means for holding the lock down when in coupled and in locked position and maintaining the lock in such position until release of the lock is desirable.

The principal object of my invention is to provide positive means in a "lock-to-the-lock" designed to hold the lock down when in coupled and locked position and maintaining this position of the lock until manually released by the trainman.

Another object of my invention is to provide means for operating this improved lock-to-the-lock mechanism, said means comprising the operating or uncoupling rod, a handle with a clamp sleeved over the end of the rod, and a bracket supporting the rod and operatively associated with said handle for guiding the movement thereof when operated by the trainman, thus guiding the movement of the operating rod connected thereto.

Still another object is to retain the present anticreep of the A. A. R. coupler, supplementing it with additional positive means for holding the lock in locked position.

A further object of the invention is to design a simple and efficient lock-to-the-lock mechanism such as may be cheaply manufactured.

A still further object of my invention is to position the lock-to-the-lock mechanism on the coupler where it may be readily seen by the train man operating the locking mechanism without going between the cars, thus insuring proper locking of the coupler.

These and other objects of my invention will be apparent from the specification and the drawings, wherein.

Figures 1, 3, 4:
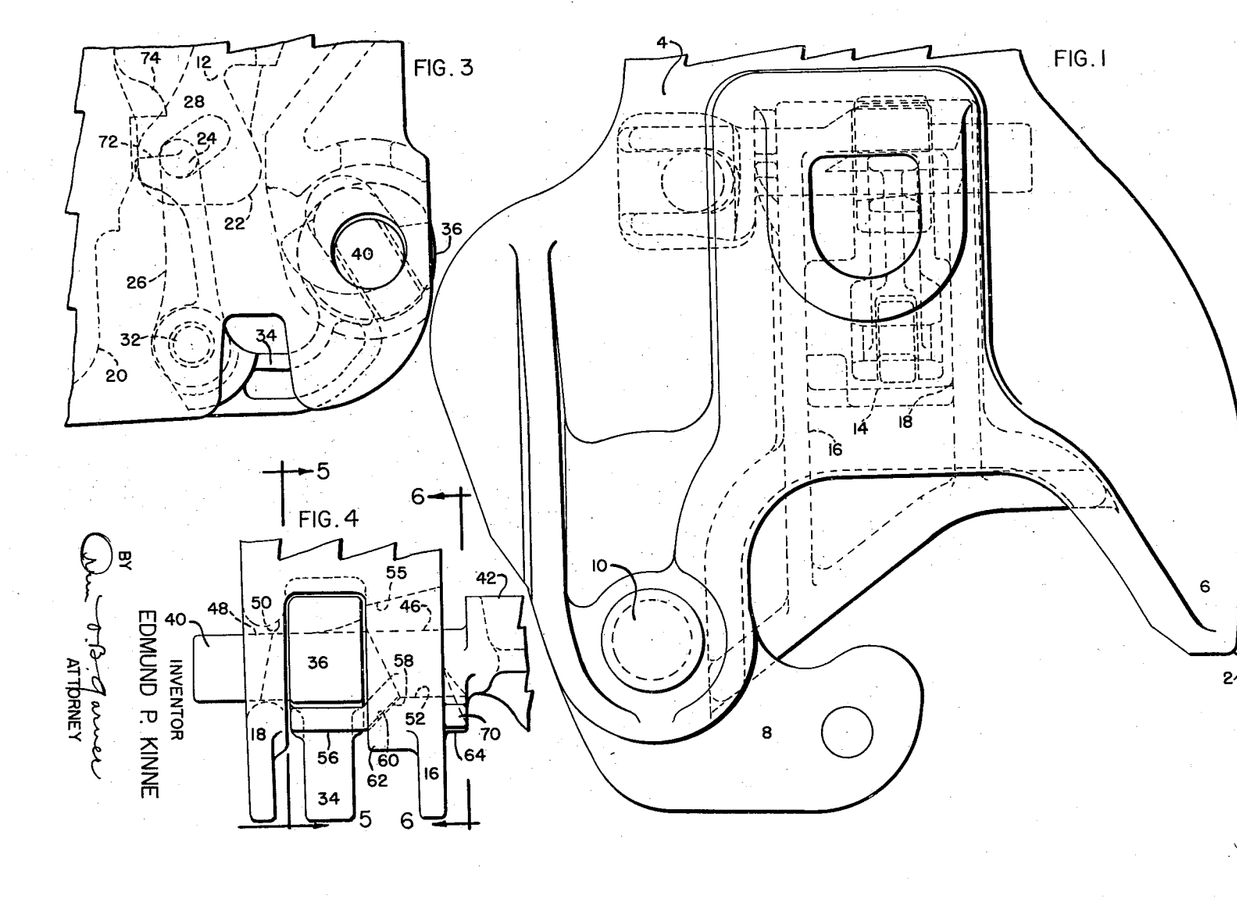
Figure 1 is a top plan view of a coupler embodying my invention, showing in phantom outline the lock-to-the-lock in locked position.
Figure 3 is a fragmentary side elevation of the coupler shown in Figure 1, taken from the guard arm side thereof.
Figure 4 is a fragmentary rear end elevation of the coupler.
Figure 2:
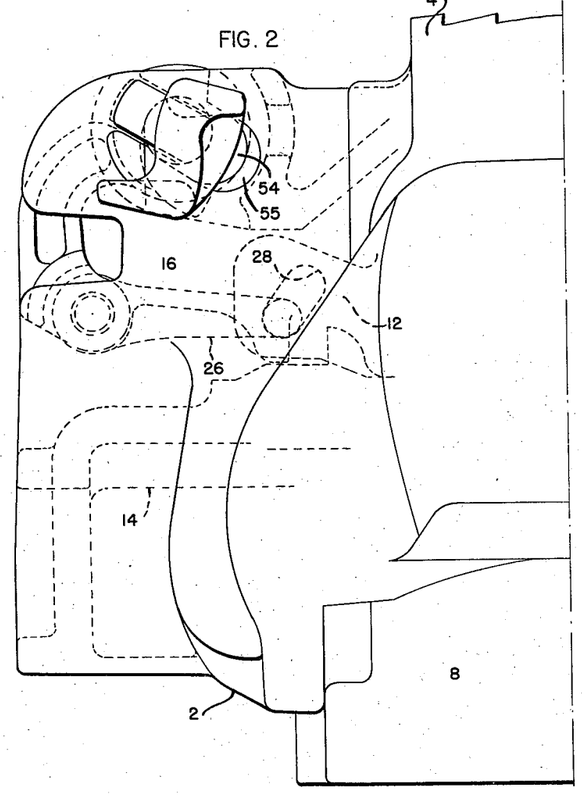
Figure 2 is a fragmentary side elevation of the coupler shown in Figure 1, taken from the knuckle side thereof.

Describing in detail my novel coupler structure and referring first to Figures 1 and 2, the coupler comprises the usual coupler head generally designated 2 and integrally formed with the shank 4, of which a fragmentary portion only is shown. The coupler head comprises the usual guard arm portion 6 and the knuckle 8 pivoted as at 10 for automatic action in well known manner and which may be locked in engagement with an associated coupler by means of the lock 12, said lock being adapted to be raised out of locking engagement with the knuckle 8 or be lowered into said engagement in well known manner. The knuckle 8 and lock 12 are operatively associated with a knuckle thrower (not shown) in usual manner. The above-described and illustrated coupler construction is well known to those skilled in the art as of Standard A. A. R. type and for that reason is believed to be sufficiently explanatory for relating the structure and operation of the bottom rotary lock-operating mechanism hereinafter described and to which my invention is directed.

The coupler head 2 is formed at the bottom thereof with a front wall 14, said wall merging with the spaced parallel side walls 16 and 18 and defining a pocket or housing 20 (Figure 5) therewith, said housing receiving the bottom rotary lock-operating mechanism and shielding the same against injury by flying objects which would otherwise strike the mechanism.

Figure 5:
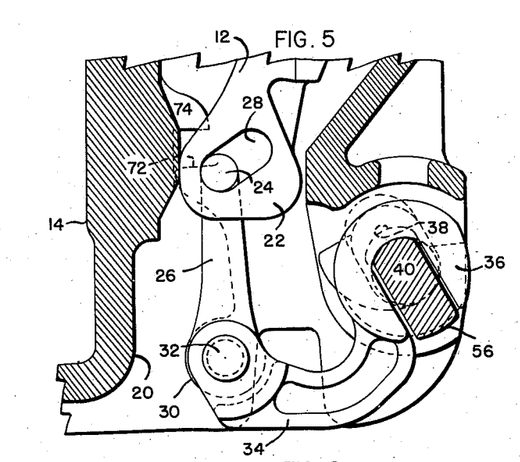
Figures 5 and 6 are fragmentary sectional views taken in the longitudinal vertical planes indicated respectively by lines 5—5 and 6—6 of Figure 4.
Figure 6:
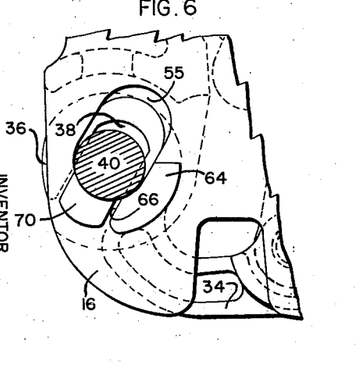
Figure 7:
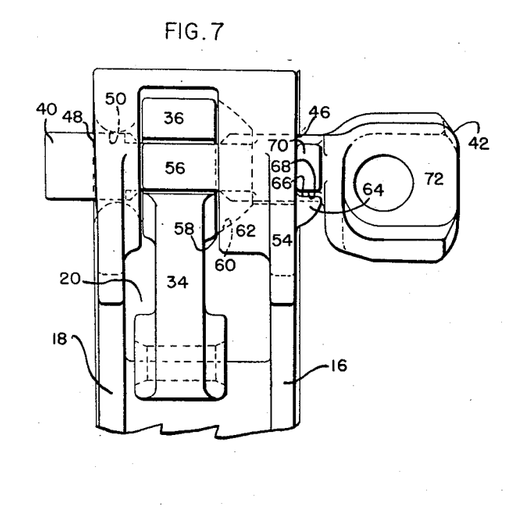
Figure 7 is a fragmentary bottom view of the coupler.
Figure 8:
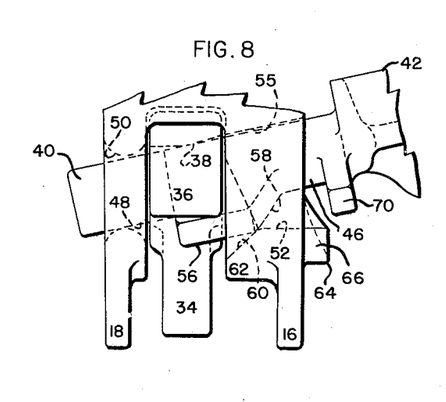
Figure 8 is a view similar to that shown in Figure 4, with the rotor pulled out and the lock-to-the-lock disengaged.

Referring now principally to Figures 3-8, the leg 22 of the lock 12 projects within the pocket 20 and the upper trunnion 24 of the toggle or link 26 is disposed within the slot 28 in the lock leg 22, the lower bearing 30 of the link being pivotally connected by a pin 32 to one end of the lock-operating or lifter lever or arm 34. The opposite end of the lever 34 is formed with a downwardly opening jaw or hook portion 36 with an internal beveled or diagonal arcuate surface as at 38 as shown in Figures 6 and 8 and provided for a purpose hereinafter explained.

Figure 9:
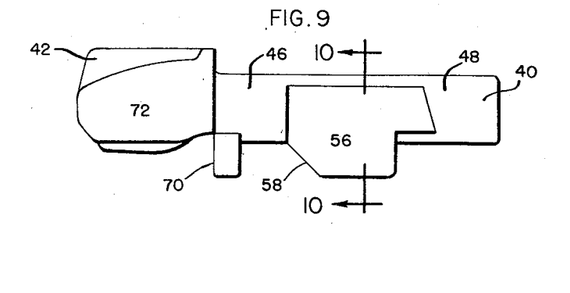
Figures 9–11 illustrate the rotor, Figure 9 being a side elevation thereof, Figure 10 a sectional view taken in the transverse vertical plane indicated by line 10—10 of Figure 9, and Figure 11 being an end elevation taken from the left as shown in Figure 9.
Figure 10:
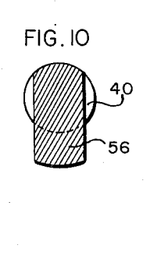
Figure 11:
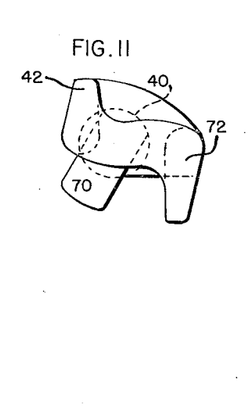

The jaw 36 receives a rotor shaft 40 of a rotor assembly or lock lifter generally designated 42 and shown in Figures 9-11, said shaft being journaled in the side walls 16 and 18 of the coupler casting as hereinafter described and as shown in Figures 4, 7 and 8.

The rotor assembly comprises the shaft 40 having the spaced journal portions 46 and 48, said portion 48 being loosely received within the oversize round-edged opening 50 provided in the wall 18 and the said journal portion 46 seats in cylindrical face engagement as at 52 (Figure 4) on the bottom of the diagonally arranged elongated slot 54 (Figure 2) in the wall 16, said slot having at the top thereof a beveled face 55 (Figure 8) provided for a purpose hereinafter described. On the shaft between the journal portions 46 and 48 thereof is provided the radially projecting integral lug 56 loosely received within the jaw 36 of the lever 34 for interlocking engagement therewith, as shown in Figure 5.

The lug 56 has a beveled or cam face 58 on one side seated on a complementary surface 60 formed on a laterally extending lug 62 integrally formed on the inner face of the side wall 16 adjacent the slot 54.

On the outer face of the wall 16 adjacent one side of the slot is provided an integral anti-creep lug or shoulder 64 having a flat face 66 on one side adapted to abut against a flat face 68 on the radially projecting anti-creep lug 70 (Figure 7) integrally formed on the shaft 40 intermediate the lug 56 and the loop end 72 thereof, said lug 70 being axially aligned with the said lug 56 on the shaft 40.

It will be readily seen that the coupler cannot be unlocked until lug 70 of the rotor is pulled longitudinally or endwise and upwardly out of engagement with the shoulder 64. This is accomplished by the operating or actuating mechanism hereinafter described, said mechanism in cooperation with the lugs 56 and 62 tilting or positioning the rotor assembly in a manner illustrated in Figure 8, wherein it will be observed that in such tilted position the shaft bears against the diagonal or beveled arcuate surface 38 within the jaw 36 of the arm 34 and against the diagonal or beveled arcuate surface 55 of the slot 54, and that the face 58 on the lug 56 either clears or lightly rides upon the associated surface 60 on the lug 62 and that the lug 70 is positioned outwardly and upwardly of the shoulder 64. The rotor shaft may now be rotated in a clockwise direction (Figure 5) to unlock the coupler, this rotation causing the lever 34 to be pivoted forwardly and upwardly to effect upward sliding movement of the trunnion 24 of the link 26 in the slot 28 of the lock leg. Upon abutment with the upper end of the slot, the trunnion 24 will move the lock upwardly and rearwardly with respect to the coupler head to disengage the anticreep lug 72 on the toggle normally underlying the laterally extending lug or foot 74 on the front wall 14 to hold the lock in knuckle-locking position, whereby the lock will be raised out of locking engagement with the knuckle 8 in a well known manner. It will be apparent that rotation of the rotor shaft 40 in a counterclockwise direction (Figure 5) from the unlocked position will cause a reversal of movements of lever 34 and link 26 and thereby lower the lock into locking engagement with the knuckle with the anticreep lug 72 lying underneath the foot 74 as in Figures 3 and 5.

It will be appreciated that in locking the coupler, the rotor will be rotated to a point where it will drop back into the position shown in Figure 4, the weight of the operating or uncoupling rod to be described causing the rotor to slide downwardly on the sloping surface 60 of the lug 62 and into the lock-to-the-lock position, wherein lug 70 engages the shoulder 64.

Figure 12:
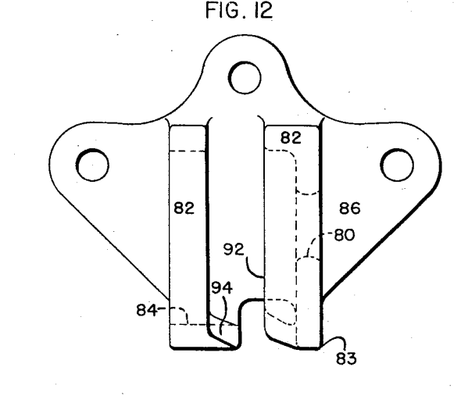
Figures 12–14 illustrate the operating rod bracket, Figure 12 being a front elevation thereof, Figure 13 a bottom view and Figure 14 a side elevation.
Figure 13:
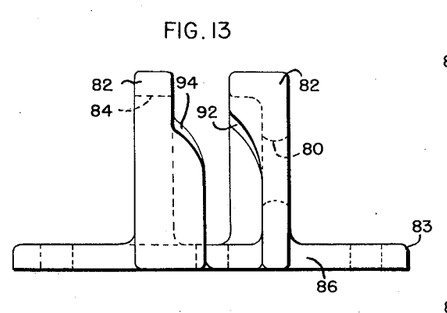
Figure 14:
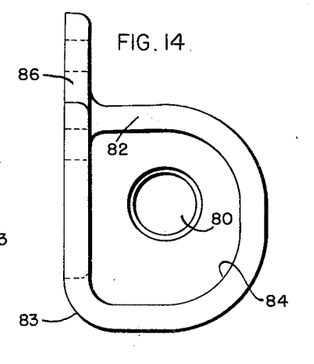
Figure 15:
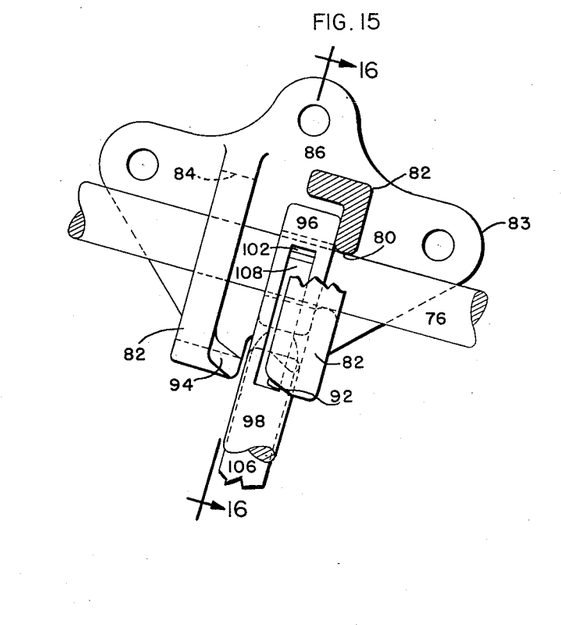
Figure 15 is a fragmentary elevational view of the car coupler operating mechanism with a portion of the bracket being shown in vertical section.
Figure 16:
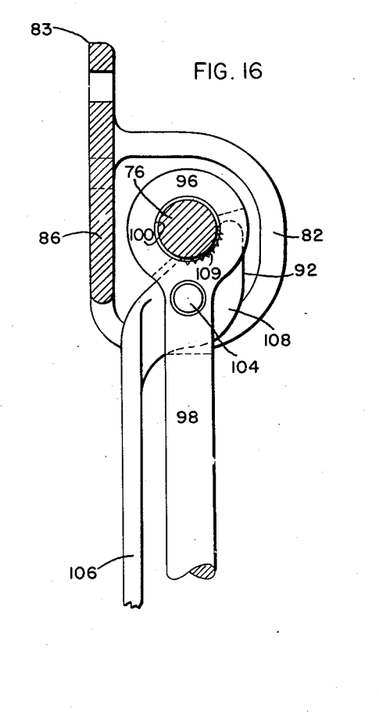
Figure 16 is a sectional view of the structure shown in Figure 15, the view being taken in the plane substantially as indicated by line 16—16 of Figure 15 with the handle mechanism, however, being shown in elevation.
Figure 17:
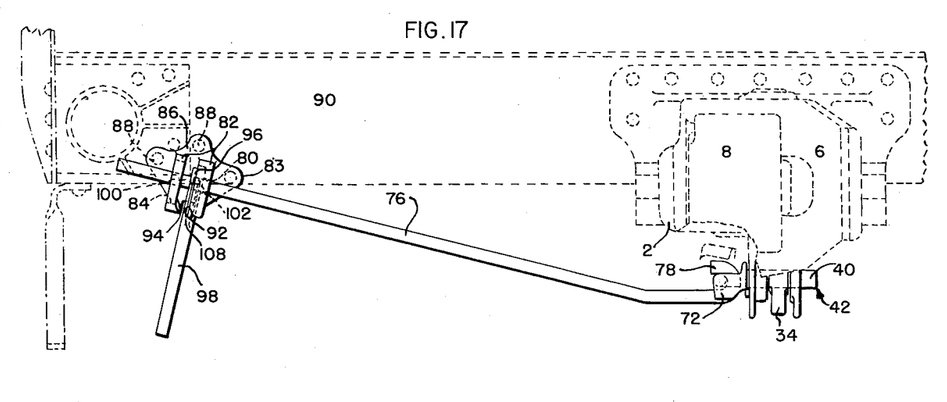
Figure 17 is a front view of the coupler as applied to the car (fragmentarily shown) including the operating assembly.
Figure 18:
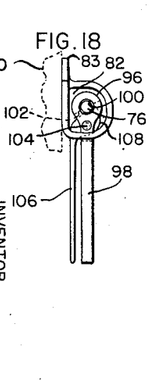
Figure 18 is a side elevation of the handle and clamp as applied to the bracket and operating rod as seen in Figure 17.

The operating mechanism hereinbefore referred to comprises an operating or uncoupling rod 76, the inner end 78 of which is hooked to the loop end 72 of the rotor assembly 42 as seen in Figure 17. The outer end of said rod extends through the round-edged opening 80 provided in one of the vertical ears or walls 82 of the bracket generally designated 83 and through the opening 84 in the other of said ears 82, said bracket having a rear or mounting wall 86 secured as by rivets 88, 88 to the end sill 90 of the car. It will be observed in Figure 12, which is a front elevation of the bracket, that the adjacent or inner surfaces 92 and 94 are cam-faced or formed in a spiral. On the rod 76 between the ears 82, 82 of the bracket is mounted a two-piece handle mechanism for operating the rod 76. One of these pieces comprises a head 96 and an integral handle or shank portion 98, said head being received between the surfaces 92 and 94 for guiding engagement thereby, as hereinafter described, and in the head is provided a round transverse opening through which the uncoupling rod extends, affording a support for the handle mechanism. It will thus be apparent from a consideration of Figures 15 and 16 that inasmuch as the operating rod 76 is round, the handle mechanism is, in effect, pivoted on the rod and may normally, when it is not being operated by the trainman, swing freely on the rod. This, of course, prevents unwanted rotation of the operating rod 76 and, in turn, rotation of the rotor or lock lifter connected thereto due to service movements of the car swinging the handle mechanism.

Within the head 96 of the one piece of the handle mechanism is provided a slot 102 substantially at right angles to the opening 100 and communicating therewith, as best seen in Figure 16. The other piece or part of the handle mechanism is in the form of a clamp member comprising a handle portion 106 and a jaw portion 108 formed at one end of the handle portion 106 and toothed as at 109 at one side thereof. The jaw portion 108 of the clamp member is received within said slot 102 in said head 96 and is pivoted as at 104 to said handle portion 98 of said one piece of the handle mechanism. It will be observed that the toothed side of the jaw portion rests against the rod 76 while the handle portion 106 of the clamp member extends adjacent the handle portion 96 (Figure 16).

To unlock the coupler from a locked position, the handle portions 98 and 106 of the handle mechanism in their normal positions as seen in Figures 15–18 are simultaneously grasped by the trainman and are squeezed together, causing the jaw portion 108 and the head 96 of the two pieces of the handle mechanism to grip the rod 76 tightly therebetween so that any movement of the handle mechanism will be imparted to the rod 76. From such position, the handle mechanism is then rotated in a counterclockwise direction (Figure 16), the movement of the handle mechanism causing the head 96 to be guided by and between the surfaces 92 and 94 (Figure 15), whereby the handle mechanism is caused to simultaneously move laterally, thus imparting the same movement to the uncoupling rod and the rotor connected to said rod, that is, the rod will be rotated and will simultaneously move endwise in a direction away from the coupler and at the same time will cause similar movement of the rotor, that is, the rotor will also be rotated and is simultaneously moved endwise which in turn causes the rotor to tilt and disengage the lock-to-the-lock, the tilting of the rotor being caused by the lug 56 sliding on its face 58 upwardly on the diagonal face 60 on the lug 62 until it assumes the position shown in Figure 8. Further counterclockwise movement of the handle mechanism causes the rotor to unlock the coupler, as hereinbefore described. A reversal of the movement of the handle mechanism will, of course, reverse the movement of the rod 76 and the rotor and will cause the coupler lock to lock.

The assembly of the locking mechanism which locks the coupler will not be described inasmuch as the same is believed to be well understood in the art.

To assemble the novel rotor with the lever 34, the journal end portion 48 thereof is inserted into the slot 54, thus engaging the diagonal arcuate surface 38 within the jaw 36 of the lever. Moving the rotor inwardly forces the lever upwardly a sufficient amount (it being understood that there is enough play in the parts to accommodate such movement) to permit the lug 56 to pass through the slot 54 in the wall 16. In this position the top surface of the shaft rests against the diagonal arcuate surface 55 at the top of the slot 54. Further inward movement positions the lug 56 in the jaw 36 of the lever 34, the inner extremity of the rotor simultaneously being projected through the opening 50 in the wall 18. The rotor drops of its own weight downwardly, the face 58 of the lug 56 sliding on the complementary surface 60 on lug 62. In this position the face 66 on the lug 64 engages face 68 on lug 70. The uncoupling rod is then assembled with the associated handle mechanism, the bracket, and with the rotor 42.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a coupler, a coupler head, a lock therewithin, a lifter, a link pivoted to said lock and lifter, a rotor supported by spaced walls of said head and connected to said lifter, said rotor being rotatable on its axis and movable transversely of said walls and rotatable in an axial plane substantially vertically of one of said walls, one end of said rotor projecting through an elongate slot in said one wall, the other end of said rotor extending through an opening in the other of said walls, a lug with a downwardly sloping surface on the inboard face of said one wall, a lug on said rotor between said walls and having a face in complementary engagement with said surface and slidable thereon, a shoulder on the outboard face of said one wall adjacent said slot, another lug on said rotor abutting the outboard face of said one wall and the adjacent side of said shoulder for preventing rotation of said rotor in the locking position of said lock, and actuating means connected to said rotor for simultaneously rotating the latter and moving the same transversely of said walls, whereby said first-mentioned rotor lug is caused to slide upwardly upon said surface, thus moving said one end of the rotor upwardly within said slot and disengaging said second-mentioned rotor lug from said shoulder for permitting further rotation of said rotor on its axis for unlocking said coupler.

2. In a coupler, a coupler head, a lock therewithin, a rotor operatively connected to said lock and journaled in said head at one end and extending through a slot in said head at the other end, operating means connected to said last-mentioned end of said rotor for rotating and simultaneously axially moving and rotating the rotor in an axial plane, and abutting means on said rotor and said head within and without said head, certain of said abutting means preventing the rotation of said rotor in the locking position of said lock, the other of said abutting means cooperating with said operating means upon actuation thereof for disengaging said first-mentioned abutting means to permit rotation of said rotor on its longitudinal axis for unlocking said coupler.

3. In a coupler, a coupler head, a lock therewithin, a rotor operatively connected to said lock and journaled in said head at one end and extending through a slot in said head at the other end, actuating means connected to said last-mentioned end of said rotor and operable to rotate and simultaneously axially move the said rotor, abutting means on said head and rotor within and without said head, the abutting means without said head preventing the rotation of said rotor in the locking position of said lock, the abutting means within said head being operable upon actuation of said actuating means to tilt said rotor to disengage said abutting means without said head to permit further rotation of said rotor for unlocking said coupler.

4. In a coupler, a coupler head, a lock therewithin, a rotor operatively connected to said lock and journaled in said head at one end and extending through a slot in said head at the other end, actuating means connected to said last-mentioned end of said rotor and operable to move said rotor to a predetermined operating position, abutting means on said head and rotor within and without said head, the abutting means without said head preventing the rotation of said rotor in the locking position of said lock, the abutting means within said head being operable to tilt said rotor in disengaged position of said abutting means without said head for permitting further rotation of said rotor for unlocking said lock.

5. In a coupler, a coupler head, a lock therewithin, a rotor operatively mounted in said head and connected to said lock, a lug on said rotor engageable with a lug on said head for preventing rotation of said rotor in the direction of unlocking said lock, actuating means connected to said rotor, and abutting lugs on said head and said rotor in complementary diagonal face engagement with each other and operable upon actuation of said actuating means to cause one end of said rotor to tilt to a position of disengagement of said first- and second-mentioned lugs for thus permitting further rotation of said rotor for unlocking said coupler.

6. In a coupler, a coupler head, a lock therewithin, actuating means, a rotor operatively connected to said lock and said actuating means and journaled into spaced walls of said coupler and movable transversely thereof and at one end movable upwardly of one of said walls in an elongate slot therein, interengaging means on said rotor and said one wall adjacent said slot for preventing rotation of the rotor in the locked position of said lock, and means on said rotor and said one wall adjacent said slot operable upon actuation of said actuating means to raise said one end of said rotor within said slot to disengage said first-mentioned means to permit rotation of said rotor for unlocking the said lock.

7. In a handle for a coupler operating means, a handle member comprising a flattened head with a transverse through opening for reception of an associated uncoupling rod member, a slot in said head in the plane thereof and communicating with said opening, a clamp member comprising a portion adaptable to be manually gripped together with said handle member and including a jaw portion toothed on one side thereof and pivoted to said head within said slot, said jaw portion with said head being adapted to grip said rod member, whereby movement of said handle will effect corresponding movement of said rod member.

8. In a coupler, a coupler head, a lock therewithin, a rotor supported by spaced walls of said head and extending through an opening in one of said walls at one end and through an elongate diagonally disposed slot in the other of said walls at the other end, lock-to-the-lock means and lock-to-the-lock release means on said rotor and said other wall, said lock-to-the-lock means preventing rotation of said rotor in the locking position of said lock, and actuating means for said rotor and operable upon actuation thereof in cooperation with said lock-to-the-lock release means to raise said other end of said rotor within said slot for disengaging said lock-to-the-lock means, thus permitting rotation of said rotor for unlocking said coupler.

9. In a coupler, a coupler head, a lock therewithin, a rotor operatively connected to said lock and journaled in said head, a radially projecting element on said rotor, an externally protruding element on said head and engageable with said rotor element for preventing rotation of said rotor in the locking position of said lock, actuating means on said rotor for rotating and simultaneously moving it axially, abutting means on said rotor and said head cooperatively associated with said actuating means for lifting one end of said rotor substantially upwardly for disengaging said elements to permit rotation of said rotor to unlock said coupler.

10. In a coupler, a coupler head, a knuckle pivoted therein, and a lock movable into and out of locking engagement with said knuckle; the combination of a rotor carried by said head, an operative connection between said rotor and said lock for actuation thereof, an abutment on said rotor engageable with an abutment on said head to limit rotation of said rotor, thereby affording a lock-to-the-lock, and means for guiding the movement of the rotor during actuation thereof to unlock the knuckle to a position disposing the abutment thereon outwardly and upwardly with respect to the coupler head abutment out of engagement therewith to permit rotation of the rotor to operate said lock.

11. In an actuating assembly for lock-operating means of a coupler head lock, a bracket mounted on an associated car body and having spaced substantially parallel ears with transverse openings therethrough, a rod connected to said means and extending through said openings in said ears, cam surfaces on the adjacent sides of said ears, a handle with a clamp hung from said rod between said surfaces, said handle with said clamp being operable to grip said rod and to rotate the same and in cooperation with said cam surfaces to simultaneously move said rod axially for actuation of said operating means.

12. In a coupler, a coupler head, a knuckle pivoted therein, and a lock movable into and out of locking engagement with said knuckle; the combination of a rotor carried by said head, an operative connection between said rotor and said lock for actuation thereof, and an abutment on said rotor engageable with an abutment on said head to limit rotation of said rotor, thereby affording a lock-to-the-lock, said rotor being movable axially and rotatable on angularly related axes whereby axial movement of said rotor accompanied by rotation thereof on one of said axes is effective to dispose said rotor in a position disengaging the abutment thereon from the coupler head abutment, thereby accommodating rotation of the rotor on the other of said axes to actuate said lock.

13. In a coupler, a coupler head, a lock therewithin, a rotor mounted in said head and operatively connected to said lock, elements on said rotor and said head engageable to prevent rotation of said rotor in the locking position of said lock, actuating means connected to said rotor for simultaneously rotating and laterally moving the rotor, and means operable upon actuation of said actuating means to tilt the said rotor at one end into disengaged position of said elements for permitting further rotation of said rotor for unlocking said lock.

14. A rotor for a coupler lock-operating means comprising a shaft with journal portions adjacent the ends thereof, a lug on said shaft intermediate said journal portions, another lug on said shaft axially aligned with said first-mentioned lug and positioned at a point intermediate one of said journal portions and one end of said shaft, a coupling portion on said one end of said shaft, and a surface on said first-mentioned lug adjacent said second-mentioned lug and obliquely angled with respect to said shaft.

15. In a coupler, a coupler head, a lock therewithin, a rotor supported by said head and tiltable therewithin and movable transversely thereof and operatively connected to said lock, engageable locking means for said rotor on said rotor and said head, and means on said rotor and head within the latter and operable upon the movement of said rotor in one direction transversely of said head to tilt said rotor to thus disengage said locking means.

16. In a coupler, a coupler head, a lock therefor, rotor means operatively connected to said lock, cooperating anticreep elements on said rotor and said head disposed externally of the latter and engageable to afford anticreep means in the locked position of the lock to prevent accidental rotation of the rotor, and cooperating means on said rotor and said head adapted to move said rotor to a position disengaging said elements, thereby accommodating rotation of said rotor for unlocking said lock.

17. In a coupler, a coupler head, a lock therewithin, a rotor operatively connected to said lock, means on said rotor and said head engageable to prevent rotation of said rotor in the locking position of said lock, said means comprising a shoulder positioned externally on said head, and a lug on said rotor externally of said head and releasably engageable with said shoulder.

18. In a coupler lock, a rotor for operating said lock and comprising a rigid member with journal portions adjacent the ends thereof, a lug on said member intermediate said journal portions and having a beveled cam face on one side thereof, and another lug on said member intermediate one end of said member and the adjacent journal portion, said one end being formed and arranged to provide a connection for said member to associated actuating means.

19. In a coupler, a coupler head, a lock therewithin, a rotor operatively connected to said lock, supplementary locking means on the rotor and said head disposed externally of the latter and affording a lock-to-the-lock in the locked position of said lock, and means on said rotor and said head internally of the latter and in diagonal face engagement with each other for camming said rotor during longitudinal actuation thereof to a position unlocking said supplementary locking means, thereby accommodating rotation of said rotor for unlocking said lock.

20. A rotor for a coupler lock comprising a shaft, a lug on said shaft intermediate the ends thereof, a cam surface on said lug facing toward one end of the shaft, coupling means at said one end of said shaft for connection to associated rotating and pulling means, and an anticreep lug on said shaft adjacent said coupling means.

21. In a rotor for actuation of an automatic railway coupler lock; the combination of a shaft having a cam surface intermediate its ends, means at one end of the shaft for connection to associate pulling and rotating means, and a lock-to-the-lock surface on said shaft angularly related to the cam surface.

22. In a coupler lock-operating mechanism, an assembly comprising a rod member and a handle member mounted on said rod member for slidable movement thereon under nonoperating conditions of said assembly, releasable means on said handle for coupling said members together in operating condition, a bracket rotatably supporting said assembly, and cam means on said bracket cooperative with one of said members for moving said assembly axially of said rod during rotation of the assembly when in operating condition.

23. In a coupler lock-operating arrangement, a rod comprising a portion sloping upwardly toward one end of said rod, a support comprising an ear extending substantially perpendicular to said portion and having an opening receiving said portion therethrough, a cam surface on said ear facing toward said one end of said rod, and a handle mounted on said rod portion between said ear and said end and adapted to slide downwardly along said portion under the influence of gravity whereby said handle is caused to frictionally engage said surface to prevent free swinging of said handle.

24. In a coupler lock-operating mechanism, an assembly comprising an operating rod member and a handle member for actuating said rod member, a bracket supporting said assembly, said members being relatively slidably movable longitudinally of said rod to accommodate lateral angling of said coupler.

25. In a coupler lock-operating mechanism, an assembly comprising a bracket with spaced substantially parallel inboard and outboard ears provided with cam faces on adjacent sides, a rod having a body portion sloping upwardly toward its outboard end and extending through openings in said ears substantially perpendicular thereto, a handle extending generally perpendicular to said portion and mounted thereon between said ears, said handle being slidable downwardly on said rod portion against the cam face on the inboard ear to frictionally engage the same when said handle is not in use, whereby free swinging of the handle is prevented.

26. A bracket for a coupler lock-operating assembly comprising a substantially vertical mounting wall, spaced substantially parallel ears extending outwardly from one side of said wall, and cam surfaces on adjacent sides of said ears curving from said mounting wall toward the ends of said ears remote from said wall in a direction toward one of said ears.

27. A coupler head comprising spaced generally parallel side walls for supporting a lock rotor, a journal opening in one wall, an elongated slot in the other wall sloping upwardly forwardly of said head and aligned with said opening transversely of said walls, and an anticreep lug on the external side of said other wall adjacent the lower end of said slot.

28. A coupler head according to claim 27, wherein the upper end of said slot is provided with a beveled face sloping downwardly toward the one wall.

29. A coupler head according to claim 27, wherein said other wall is provided with a lug element on its inner side adjacent said lower end of said slot, and a cam face on the upper part of said element sloping upwardly toward said slot.

30. A coupler head comprising a side wall for supporting an associated lock rotor and having an elongated slot therethrough, and an anticreep lug and cam means on opposite sides of said wall adjacent the lower end of said slot for cooperation with the associated rotor, said slot being adapted to accommodate upward movement of the associated rotor to disengage the same from said lug upon certain movement of the rotor on said cam means.

31. A coupler head comprising spaced side walls with openings therethrough for supporting a lock rotor, an anticreep lug on one side of one of said walls, and a cam lug on the opposite side of said one wall.

32. In a coupler, a coupler head having spaced walls, a lock within said head, a rotor operatively connected to said lock and extending through openings in said walls, anticreep means on one side of one of said walls and said rotor, affording a lock-to-the-lock in the locked position of said lock, and release means at the opposite side of said one wall and said rotor for releasing said anticreep means.

EDMUND P. KINNE.

REFERENCES CITED

The following references are of record in the file of this patent:

UNITED STATES PATENTS

| Number | Name | Date |
| --- | --- | --- |
| 649,347 | Penninger | May 8, 1900 |
| 707,048 | Chubb | Aug. 12, 1902 |
| 1,162,333 | Buhoup | Nov. 31, 1915 |
| 1,913,535 | Cressey | June 13, 1933 |
| 2,408,653 | Kinne | Oct. 1, 1946 |
| 2,409,322 | Swann | Oct. 15, 1946 |